(12) United States Patent
Manderson et al.

(10) Patent No.: US 8,980,064 B2
(45) Date of Patent: Mar. 17, 2015

(54) PYROLYTIC PROCESS AND APPARATUS FOR PRODUCING BIOMASS CHAR AND ENERGY

(76) Inventors: Laurence Rex Manderson, Sherwood (AU); Daniel Charles Manderson, Sherwood (AU)

(*) Notice: Subject to any disclaimer, the term of this patent is extended or adjusted under 35 U.S.C. 154(b) by 645 days.

(21) Appl. No.: 13/320,541

(22) PCT Filed: May 12, 2010

(86) PCT No.: PCT/AU2010/000550
§ 371 (c)(1),
(2), (4) Date: Nov. 14, 2011

(87) PCT Pub. No.: WO2010/129996
PCT Pub. Date: Nov. 18, 2010

(65) Prior Publication Data
US 2012/0055775 A1    Mar. 8, 2012

(30) Foreign Application Priority Data
May 14, 2009  (AU) .............................. 2009902163

(51) Int. Cl.
C10B 1/10  (2006.01)
C10B 47/30  (2006.01)
C10B 53/02  (2006.01)

(52) U.S. Cl.
CPC . *C10B 47/30* (2013.01); *C10B 1/10* (2013.01); *C10B 53/02* (2013.01); *Y02E 50/14* (2013.01)

USPC .......................................... 202/131; 202/218

(58) Field of Classification Search
CPC ............ C10B 1/10; C10B 47/30; C10B 53/02
USPC ................. 202/110, 128, 129, 131, 218, 249; 201/32, 35
See application file for complete search history.

(56) References Cited

U.S. PATENT DOCUMENTS

| | | | | |
|---|---|---|---|---|
| 1,944,647 A | * | 1/1934 | Petit | 202/131 |
| 2,664,389 A | * | 12/1953 | Rex et al. | 202/131 |
| 6,830,597 B1 | * | 12/2004 | Green | 201/35 |
| 2008/0281133 A1 | | 11/2008 | Seidel | |

FOREIGN PATENT DOCUMENTS

| | | |
|---|---|---|
| CN | 101134899 A | 3/2008 |
| JP | 2001-32412 | 2/2001 |
| JP | 2004-043708 A | 2/2004 |

* cited by examiner

*Primary Examiner* — Jill Warden
*Assistant Examiner* — Joye L Woodard
(74) *Attorney, Agent, or Firm* — Birch, Stewart, Kolasch & Birch, LLP

(57) ABSTRACT

A pyrolytic conversion assembly for processing biomass including: a rotary kiln including a tube for heating the biomass at pressure having a sealable inlet at a first, higher end for ingress of the biomass, and a sealable outlet at a lower end for egress of charcoal formed from the biomass; and heating elements disposed around the kiln to provide a localized source of heating at a predetermined distance from the sealable inlet for reflux condensation of gas from the biomass.

16 Claims, 1 Drawing Sheet

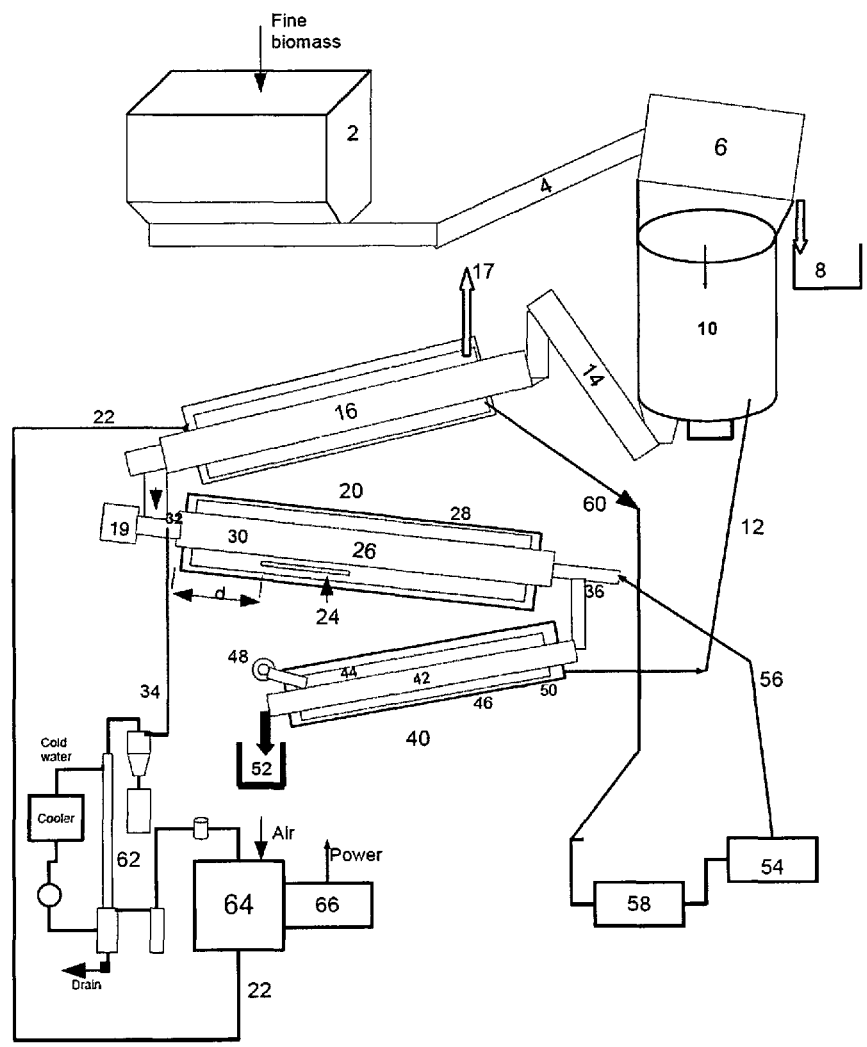

PYROLYTIC PROCESS AND APPARATUS FOR PRODUCING BIOMASS CHAR AND ENERGY

This application is the National Stage under 35 U.S.C. §371 of International Application Number PCT/AU2010/000550 filed on May 12, 2010, which claims priority under 35 U.S.C. §119(1)-(d) of Application Number 2009902163 filed on May 14, 2009 in Australia.

I. FIELD OF THE INVENTION

The present invention relates to a pyrolytic converter. One embodiment of the invention is particularly applicable where it is desired to convert plant waste material, such as sawdust into combustible gas and charcoal.

II. BACKGROUND

Biomass conversion processes are known in the prior art. In general, their objective is to convert biomass, for example, wood, grain, manure, sugar cane bagasse, rice husks, corn stalks, and the like, into gas and liquid fuels, charcoal and other useful products with net energy gain and minimal production of unwanted by-products.

If let decompose by microbiological processes, the biomass will degrade into many other components, including carbon dioxide, organic oils and tars and create noxious emissions while doing so. Furthermore, the energy content of the biomass will be dissipated and go unharnessed. As an alternative to allowing biomass to decompose, it would be preferable if it could be efficiently converted into useful products such as industrial feedstock, with the inherent energy content realized.

Conversion of biomass through a pyrolysis process has been the subject of much investigation in the past with a variety of objectives, including production of synthetic gas and oil for industrial feedstock and power generation.

A common objective is to convert biomass to charcoal for use as fuel. Traditional methods have used individually loaded kilns employing a slow pyrolysis technique which suffers from slow rates of conversion and production of many unwanted pollutants, such as carbon monoxide and various tars.

It is an objective of the present invention to provide a pyrolytic conversion assembly to convert waste biomass to a sufficiently pure form of charcoal that can be buried in the topsoil without detriment to the plant or microbiological life.

It is a further objective of the present invention to provide a biomass conversion process that is a net energy producer.

III. SUMMARY OF THE INVENTION

According to a first aspect of the present invention there is provided a pyrolytic conversion assembly for processing biomass including:
- a rotary kiln including a tube for heating the biomass at pressure having a sealable inlet at a first, higher end for ingress of the biomass, and a sealable outlet at a lower end for egress of charcoal formed from the biomass; and
- heating elements disposed around the kiln to provide a localised source of heating at a predetermined distance from the sealable inlet for reflux condensation of gas from the biomass.

According to a preferred embodiment, the rotary kiln includes a decomposition products gas outlet toward the higher end for egress of gaseous smaller order hydrocarbons from the tube.

The sealable outlet at the lower end preferably includes a seal gas port, to inject gas into the kiln to thereby prevent the decomposition products leaving the kiln with the charcoal.

An electronic processor may be provided that is arranged to monitor torque required to rotate the rotary kiln and to regulate feeding of the kiln in response to the monitored torque.

Preferably the pyrolytic conversion assembly includes a dryer for drying the biomass with a dryer outlet side coupled to the sealable ed inlet for passing dried biomass to the rotary kiln.

In a preferred embodiment the assembly includes a combustion engine having a fuel intake arranged to be fueled with hydrocarbons exiting the decomposition products gas outlet of the rotary kiln.

The dryer may include an exhaust gas inlet port to receive exhaust gases from the combustion engine for assisting in drying of the biomass.

An electrical generator may be mechanically coupled to an output shaft of the combustion engine.

Electrical output connectors of the electrical generator are preferably coupled to electrical components of said assembly, including the heating elements for powering of said components.

The fuel intake of the gas engine may communicate with the decomposition products gas outlet of the kiln via a condensate trap and preferably other appropriate gas treatment equipment, including, for example one or more of a dust cyclone, steam condenser, a filter and a back pressure regulator.

The pyrolytic conversion assembly preferably includes a cooler having an input side to receive charcoal from the kiln.

In a preferred embodiment the cooler is air cooled and includes a pipe to convey warmed air from the cooler to a hopper for preheating of the biomass, said hopper being located upstream of the dryer.

Piping may be arranged to place the exit seal gas port of the kiln in communication with the dryer whereby exhaust gas from the dryer is used to provide a low oxygen gas supply for the seal gas.

It is preferred that a radiator and compressor be inserted in the piping between the exit gas port and the dryer for processing the cooled exhaust gas prior to it arriving at the seal.

Each of the dryer, kiln and cooler are preferably declined and coupled to rotation assemblies so that solids are transported through them by gravity and rotation during operation of said assembly.

In the preferred embodiment of the pyrolytic conversion assembly, said tube, sealable inlet, sealable outlet and heating elements of the rotary kiln are arranged to provide an operating temperature of at least 400° C. at a pressure of at least 700 kPa.

One or more rotation assemblies are preferably provided to respectively rotate each of the dryer, kiln and cooler.

A pyrolytic conversion assembly according to claim 1, where either or both of the sealable inlet and outlet is provided by plug screw feeders.

According to a further aspect of the present invention there is provided a method for the pyrolytic processing of biomass including a step of:
- heating the biomass at elevated temperature and pressure to elicit decomposition vapors therefrom;
- reflux condensing the decomposition vapors therefrom; and
- powering a combustion engine with fuel derived from products of the reflux condensed decomposition vapors.

Preferred features, embodiments and variations of the invention may be discerned from the following detailed description, which provides sufficient information for those skilled in the art to perform the invention. The detailed description is not to be regarded as limiting the scope of the preceding Summary of the Invention in any way. The detailed description will make reference to one or more drawings throughout as follows.

IV. DESCRIPTION OF THE DRAWINGS

FIG. 1 is a stylized diagram of a pyrolytic converter according to a preferred embodiment of the present invention.

V. DETAILED DESCRIPTION OF PREFERRED EMBODIMENTS

Referring now to FIG. 1, a pyrolytic converter according to a preferred embodiment of the present invention includes a feed bin 2 for storing biomass to be processed such as sawdust. While the following description will refer to biomass in the form of sawdust it will be realized that embodiments of the invention are suitable for processing other types of biomass as well.

A conveyor 4 is provided to transport the sawdust to a trammel screen 6 that filters out coarse debris, which is diverted to waste bin 8.

A fine feed hopper 10 is located under the trammel screen 6 to receive the filtered sawdust. Warm air is recycled to the hopper 10 through a warm air pipe 12 from a downstream rotary cooler unit in order to pre-heat the fined sawdust particles. An elevator screw assembly 14 is arranged between the fine feed hopper 10 and the inlet side of a rotary dryer 16. The rotary drier 16 is formed as a declining tube that is externally heated by the engine exhaust and is arranged to rotate thereby encouraging the sawdust to travel down the tube toward an outlet located at its lower end. Wet exhaust, e.g. steam and vapor passes out either end of the tube through an exhaust 17.

An inlet is formed into the lower end of the rotary dryer to receive hot exhaust gases via a hot exhaust pipe 22. The hot exhaust gases, which rise up the sides of the rotating dryer 16, heat the sawdust as it moves in a counter-current down the declined rotary dryer.

The lower end of the rotary drier 16 is coupled to a plug screw feeder or as it may be variously called a "variable pitch compression screw" 19 which compacts the dried sawdust and feeds it into a cylindrical, high pressure, indirectly fired, declining, rotary pyrolyis kiln 20. The operation of the variable pitch compression screw may be electronically controlled to prevent over-filling of the kiln 20 as will be discussed further later. This "plug screw" feeder is designed to correctly feed the finely divided biomass against the operating pressure with minimum leakage of the gas from the kiln. It is specifically designed to also facilitate the rotating seal into the kiln. A rotating kiln is preferred because it provides a rapid, uniform heat transfer to the sawdust while avoiding hotspots. The kiln 20 is maintained under a pressure of approximately 1 MPa, and temperature of 450° C., during its operation although operation at lower pressures, for example 700 kPa, and lower temperature, e.g. 400° C., is also feasible. When starting empty, the kiln is pressurized by gas from compressor 54. Once the kiln is operating the pressure is generated from the decomposition products of the sawdust being pyrolyised within. The kiln includes a steel tube 26 around which a number of localized electric heating elements 24 are disposed. The heating elements are located at a distance d from the inlet end of the metal tube so that in operation a relatively cooler, re-condensation region 30, is formed towards the inlet, being the higher end, of the metal tube 26. An insulating jacket 28 surrounds the heating elements 24 and the length of the metal tube 26 to reduce heat loss during operation of the kiln.

In operation, as sawdust moves down the tube 26 of the rotating kiln under gravity, it firstly passes through the re-condensation region 30 and is then raised to a temperature of approximately 450° C. as it passes adjacent to the heating elements 24. As the sawdust passes down the tube 26 a pyrolysis process takes place that converts the sawdust to charcoal, steam and vaporized hydrocarbon and other decomposition gas and/or vapor products. The charcoal continues down the decline of tube 26 under gravity while the vaporized hydrocarbon products rise up the tube 26 through the re-condensation zone 30. As the hydrocarbon products move up the tube 26 they encounter sawdust moving down the tube that has been newly introduced by compression screw 19 and which is significantly cooler. Consequently, heavier hydrocarbon fractions condense on the cooler sawdust and are carried back down the tube 26 to come adjacent to heating elements 24 where they are once again heated and broken down to lighter fractions in a process of reflux condensation. The hot, heavier hydrocarbon products further heat the incoming sawdust thereby increasing the efficiency of the kiln. The reflux of the vapors up into and back down from the re-condensation zone 30 ensures that only light fractions leave the kiln via fuel gas outlet 32. This advantage of positioning the heating coils 24 to provide the re-condensation zone 30 is that higher order refractory tars are trapped. While the transit time of the sawdust and charcoal through the tube 26 is short, e.g. about 15 minutes, the denser hydrocarbons remain in the tube for much longer and are subject to further breakdown into lighter fractions. At least two advantages ensue as follows.

The first advantage is a reduction in heavier fractions in the hydrocarbon output—so that when the output is cooled they remain in a gaseous state and do not condense to liquid form. These heavy fraction liquids are unstable and if they were not broken down would require a post-treatment processing strep to make them into a usable fuel.

A second advantage is that there is a more complete conversion of heavier fractions from the sawdust. These heavy fractions are finally formed into additional yield of charcoal.

The smaller order hydrocarbon vapor exits through the gas fuel outlet 32, which is coupled to a condensate trap cooler 62 via a pipe 34.

The condensate trap cooler 62 includes a number of cooling tubes that are encased with cold water. Condensate from the hydrocarbon gas is primarily water with some heavier hydrocarbon fractions which also condense as the temperature and pressure are reduced. The condensate is contaminated with hydrocarbons. However, the level of contamination is significantly lower than that of many other pyrolytic converters because of the reflux condensation that occurs in the rotary kiln 20. Consequently, the condensate can be processed in a conventional wastewater management system to reduce the contaminants to acceptable levels.

The condensate trap 62 cools the gas for the following regulator to reduce the pressure of the light hydrocarbons from the rotary kiln 20 so that they can be fed as fuel into internal combustion engine 64. A drive shaft of the engine 64 is fed to an electrical generator 66 and electrical power from the generator used to power the overall plant. For example, output connectors of the generator 66 are coupled to the electric heaters 24 and also to one or more motors of rotation assemblies which operate to rotate the rotary dryer 16, rotary kiln 20 and rotary cooler 40. Any excess power from generator 66 may be fed back to a public utility electrical grid for example. Hot exhaust from the internal combustion engine 64 is fed back to the rotary dryer 16 via pipe 22 as previously described, and thence to the atmosphere. The amount of carbon dioxide released to the atmosphere is significantly less than the amount that would have been released if the sawdust was not processed but simply left to decompose by bacterial action.

It will be appreciated that monitoring the amount of sawdust in the rotary kiln 20 is difficult because of its elevated operating temperature and pressure. Yet, it is important that the variable pitch compression screw 19 does not overfill the rotary kiln as previously mentioned. Torque required to rotate the rotary kiln 20, which is a function of the type of biomass being processed, the volume filled and the rate of rotation, is electronically monitored and processed to generate a control signal to electrically regulate the operation of the variable pitch compression screw. An advantage of doing so is that the rotary kiln is not overfilled so that the pyrolytic conversion process is optimized for economical running.

The lower end of the kiln 20 is coupled to a reciprocating valve chamber 36 with an inside valve piston and an outside seal piston. The valve piston is actuated by a rod tube through the middle of the outside piston. The cycle starts with both pistons in the closed position. A compressor 54 provides gas, sourced via pipe 60 from dryer 16, through pipe 56. The compressor 54 is protected by a radiator 58 which cools the exhaust gases from the dryer 16. The gas is charged through the rod tube and fills the space between the pistons to near the operating pressure of the kiln. The inside valve then opens inwards and allows charcoal into the space between the valves. After a short delay the inside valve piston closes scooping some more charcoal into the chamber. The outside piston then opens. More gas is supplied to blow the charcoal out of the chamber, which is in turn coupled to a cylindrical, declining, rotary cooler 40. Exhaust gas from rotary dryer 16 is used because it has a low oxygen content and so does not encourage the hot charcoal within the kiln to burn.

The rotary cooler includes a central steel tube 42 about which an insulating jacket 46 is located. The steel tube 42 and insulating jacket 46 define an air gap 44 therebetween. A fan 48 is arranged to force ambient air through the air gap 44 so that it cools the tube 42 and thence the charcoal that passes down the tube 42. An air port 50 is formed through the insulating jacket 46 and receives the inlet end of warm air pipe 12. As previously discussed, the warm air pipe 12 is coupled to the fine feed hopper 10 so that warm air from the rotary cooler 40 is used to pre-heat the sawdust entering the hopper 10.

A bag 52 is located beneath the lower, outlet end of tube 42 of the rotary cooler to receive cooled charcoal.

In the present specification and claims, the word "comprising" and its related and derivative terms, including "comprises" and "comprise", are to be interpreted in an inclusive sense as including each of the stated integers but without excluding the inclusion of one or more further integers.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The claims defining the invention are as follows:

1. A pyrolytic conversion assembly for processing biomass including:

a rotary kiln including a tube for heating the biomass at pressure having (i) a sealable inlet at a first, higher end for ingress of the biomass, (ii) a sealable outlet at a lower end for egress of charcoal formed from the biomass, and (iii) a decomposition products gas outlet toward the higher end for egress of gaseous smaller order hydrocarbons from the tube; and heating elements disposed around the tube to provide a localised source of heating at a predetermined distance from the sealable inlet for reflux condensation within the tube of heavier hydrocarbons contained in the gas from the biomass, wherein the predetermined distance is sufficient to establish a condensation region within the tube between the location of the heating elements and the first, higher end of the tube such that, in use, heavier hydrocarbons contained in the gas from the biomass condenses within the tube.

2. A pyrolytic conversion assembly according to claim 1, wherein the sealable outlet at the lower end includes a seal gas port, to inject gas into the kiln to thereby prevent the decomposition products leaving the kiln with the charcoal.

3. A pyrolytic conversion assembly according to claim 1, including an electronic processor arranged to monitor torque required to rotate the rotary kiln and to regulate feeding of the kiln in response to the monitored torque.

4. A pyrolytic conversion assembly according to claim 1, including a dryer for drying the biomass and having a dryer outlet side coupled to the sealable inlet for passing dried biomass to the rotary kiln.

5. A pyrolytic conversion assembly according to claim 4, wherein the sealable outlet at the lower end includes a seal gas port, further including piping arranged to place the seal gas port of the kiln in communication with the dryer whereby exhaust gas from the dryer is used to provide a low oxygen gas supply for the seal gas.

6. A pyrolytic conversion assembly according to claim 5, including that a radiator and compressor be inserted in the piping between the seal gas port and the dryer for processing the cooled exhaust gas prior to it arriving at the seal.

7. A pyrolytic conversion assembly according to claim 1, including a dryer for drying the biomass and having a dryer outlet side coupled to the sealable inlet for passing dried biomass to the rotary kiln, and including a combustion engine having a fuel intake arranged to be fueled with hydrocarbons originating from the decomposition gas outlet of the rotary kiln.

8. A pyrolytic conversion assembly according to claim 7, wherein the dryer includes an exhaust gas inlet port to receive exhaust gases from the combustion engine for assisting in drying of the biomass.

9. A pyrolytic conversion assembly according to claim 8, including an electrical generator mechanically coupled to an output shaft of the combustion engine.

10. A pyrolytic conversion assembly according to claim 9, wherein electrical output connectors of the electrical generator are coupled to electrical components of said assembly, including the heating elements for powering of said components.

11. A pyrolytic conversion assembly according to claim 7 wherein the fuel intake of the gas engine communicates with the decomposition products gas outlet of the kiln via a condensate trap.

12. A pyrolytic conversion assembly according to claim 1, including a cooler having an input side to receive charcoal from the kiln.

13. A pyrolytic conversion assembly according to claim 12, wherein the cooler is air cooled and including a pipe to convey warmed air from the cooler to a hopper for preheating of the biomass, said hopper being located upstream of the dryer.

14. A pyrolytic conversion assembly according to claim 12, wherein each of the dryer, kiln and cooler are declined and coupled to rotation assemblies so that solids are transported through them by gravity and rotation during operation of said assembly.

15. A pyrolytic conversion assembly according to claim 1, wherein said tube, sealable inlet, sealable outlet and heating elements of the rotary kiln are arranged to provide an operating temperature of at least 400° C. at a pressure of at least 700kPA.

16. A pyrolytic conversion assembly according to claim 1, where either or both of the sealable inlet and outlet is provided by plug screw feeders.

* * * * *